United State

Edmonds

[11] 3,832,034

[45] Aug. 27, 1974

[54] LIQUID CRYSTAL DISPLAY ASSEMBLY
[75] Inventor: Harold D. Edmonds, Hopewell Junction, N.Y.
[73] Assignee: International Business Machines Corporation, Armonk, N.Y.
[22] Filed: Apr. 6, 1973
[21] Appl. No.: 348,551

[52] U.S. Cl. .......................................... 350/160 LC
[51] Int. Cl. ................................................ G02g 1/28
[58] Field of Search ............................... 350/160 LC

[56] References Cited
UNITED STATES PATENTS
| | | | |
|---|---|---|---|
| 3,631,411 | 12/1971 | Kosonocky | 350/3.5 X |
| 3,712,047 | 1/1973 | Girard | 350/160 LC X |
| 3,723,749 | 3/1973 | Shapiro | 350/160 LC X |

OTHER PUBLICATIONS
"Reflective L. C. Television Display," by J. Van Raalte, Proc. IEEE, Vol. 56, No. 12, December 1968, pp. 2,146–2,149.

Primary Examiner—Ronald L. Wibert
Assistant Examiner—Paul K. Godwin
Attorney, Agent, or Firm—Henry Powers

[57] ABSTRACT

A liquid crystal cell in which one of a pair of opposed spaced electrodes is circumscribed by a dielectric shield or mask having a hue, chroma and brightness substantially the same as the color of either the circumscribed electrode or of the scattered state of the liquid crystal material disposed between the electrodes.

45 Claims, 6 Drawing Figures

LIQUID CRYSTAL DISPLAY ASSEMBLY

BACKGROUND OF THE INVENTION

This invention relates to informational displays, and more particularly, to liquid crystal display assemblies.

Liquid crystal devices are receiving increased interest for generating patterns of information or images in various applications, such as display panels for watches, display media, input/output terminals, and the like. Generally, such applications result from the ability to selectively alter the light transmitting and scattering states of the liquid crystals, typically by the selective application and removal of an electric field across the liquid crystals. Illustrative of these materials are the nematic liquid crystals which are normally light transparent, on ionic current injection, in an applied electric field are switched into a scattering state or mode due to induced turbulence caused therein.

In such liquid crystal devices, the liquid crystal material is sandwiched between a pair of spaced insulating substrates, at least one of which is transparent, with the inner faces coated with one or more electrodes having transparencies or opacities corresponding to that of the supporting substrates, or as required.

In one type of such device, one of the electrodes may be subdivided into a plurality of informational image segments in effect forming a corresponding member of individualized liquid crystal cells, each adapted to display a shape of the segments. By applying a switching voltage between these electrode segments and the electrode on the other substrate, the portions of the liquid crystal material can be selectively switched between their light transparent and scattering state for appropriate imaging in accordance with the pattern of signals applied to the electrode segments.

One mode of operating such cells, which is of particular interest in this application, is the reflective mode conventionally used in display applications. In such a reflective operating mode, a suitable light source, e.g. high intensity, is used for flooding the liquid crystal cell assembly, with a reflective backplate employed to reflect the modulated light images in projection on a viewing surface. However, when such liquid crystal panels are employed in a reflective mode, particularly with high intensity illumination, they are characterized with what may be described as a three color display, representing a background color of the reflector plate, the color of the back electrode and the color resulting from light modulation by the scattering state of the liquid crystal material. It would be very desirable if the display could be produced in a two-color phase which in effect would only reflect the transparent and scattering states of the liquid crystal material.

SUMMARY OF THE INVENTION

It has been discovered that a liquid crystal display can be operated in a two-color fashion by circumscribing the back or reflecting electrode with a dielectric color shield having a hue, chroma and brightness substantially matching either the color of the back electrode or the reflected color induced by the scattering state of the liquid crystal material. One particularly desirable shield for such purpose is an anodized film of aluminum which can be suitably dyed by conventional means for color matching.

Color matching between the shield and the back electrode will normally be in the positive mode. Typically, in this positive mode of operation, the liquid crystal will be in its transparent state, normally in the absence of an electric field thereacross, or where the electric field is applied below the threshold value required to switch the liquid crystal into its scattering state. In this embodiment, when the liquid crystal is in its transparent state, both the back electrode and shield will be visible in a background color without any substantial color discrimination between them. However, when an electric field is applied to switch the liquid crystal material into its scattering state at the point of the back electrode, the resulting color modulation at the scattering sites will be contrasted against the background color.

Conversely, color matching between the shield and the induced color of the liquid crystals, in their scattering state, will normally be used for operating the liquid crystal cell in the negative mode. In this negative mode, the shield will normally be lighter than the electrode, and thus contrasted when the liquid crystal material is in the transparent state; and accordingly, the back electrodes will be seen contrasted against the lighter background of the shield. With selective application and removal of electric field at the front and back electrodes, across the liquid crystal layer, selective portions of the liquid crystal can be controlled into an array of transparent and scattering states, normally in an informational pattern. As will be apparent, the color of the panel at any back electrode adjacent a liquid crystal portion in its scattering state will be merged into the background of the color shield, leaving contrasted therewith only those back electrodes at the portions of the liquid crystal layer in its transparent state.

A wide variety of liquid crystal compositions can be used, and are well known in the art, as illustrated in U.S. Pat. No. 3,703,331.

The foregoing and other objects, features and advantages of the invention will be apparent from the following more particular description of preferred embodiments of the invention as illustrated in the accompanying drawings.

DESCRIPTION OF PREFERRED EMBODIMENTS

Figure 1A:
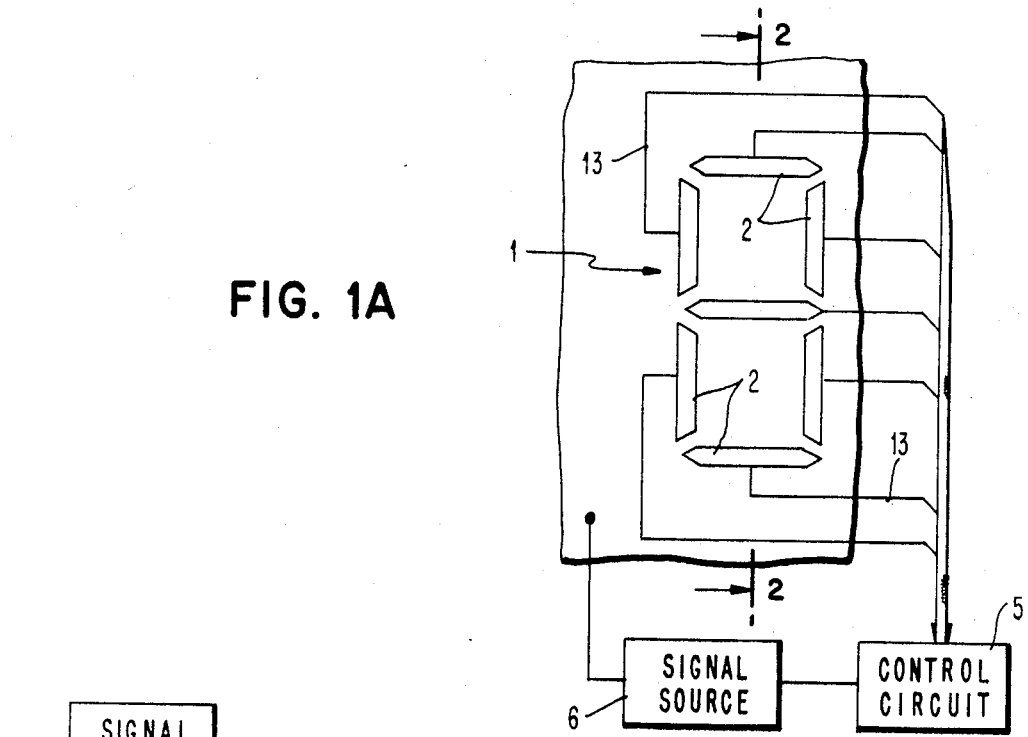
FIGS. 1A and 1B are schematic plan views illustrating typical liquid crystal display panels to which this invention is directed.
Figure 1B:
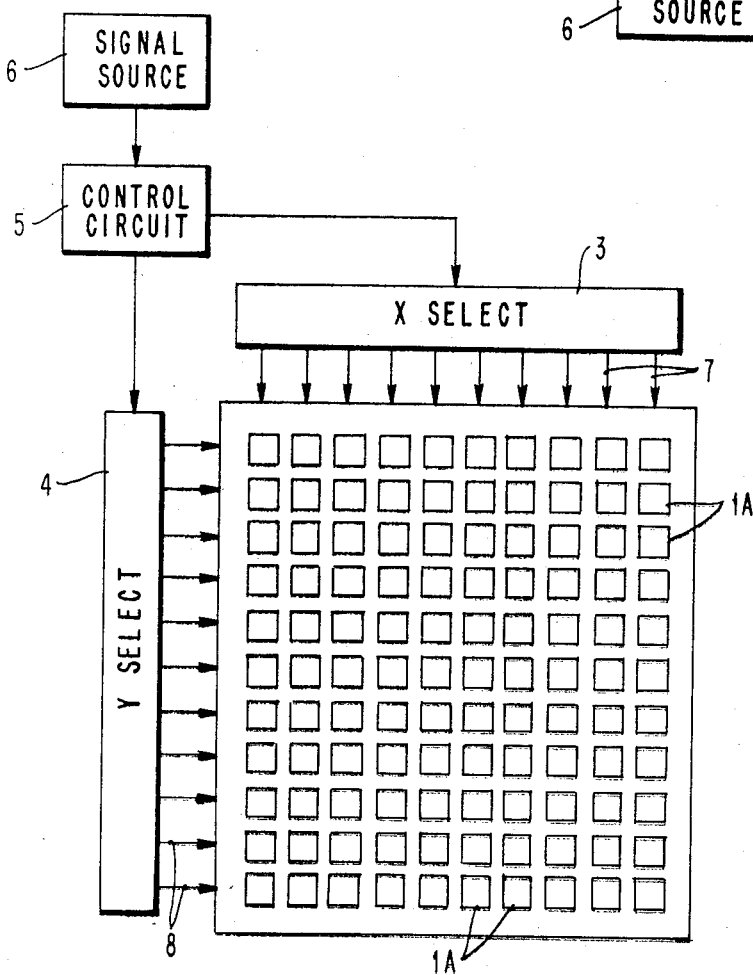

In FIG. 1A, a liquid crystal cell 1 is shown adapted as a display assembly for optical representation of desired configurations, here specifically illustrated as a numerical display, by selective application of an electric signal to appropriate ones of electrodes 2. FIG. 1B illustrates another form of a liquid crystal display panel, in which a plurality of separate discrete liquid crystal cells 1A are distributed over the panel in a matrix of rows and columns. Each liquid crystal cell is comprised of liquid crystal material sandwiched between a front electrode and a back electrode connected to conventional X and Y decode circuits 3 and 4 activated by control circuit 5 to which an informational signal pattern is fed from a source 6. In this configuration, the X-decode circuit 3 will address different ones of the columns via respective different ones of lead 7, and at the same time the Y-decode circuit 4 will similarly address the rows of liquid crystal cells via leads 8. The individual liquid crystal cells 1A are selected by coincident addressing by the decoders of the row with the column in which the cell is situated.

Figure 2:
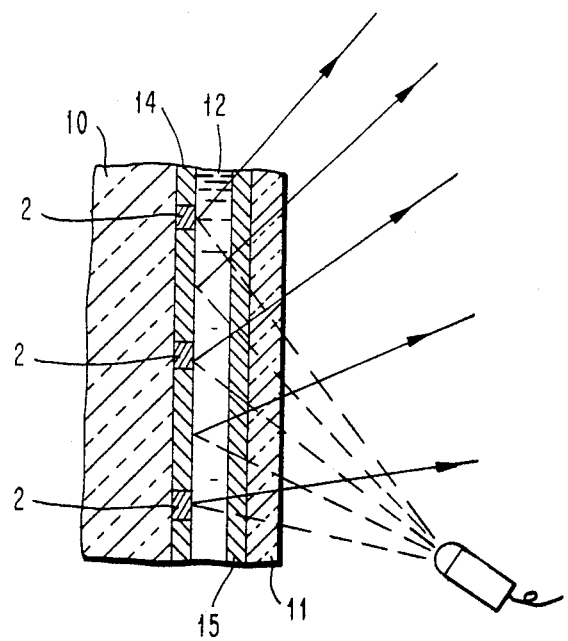
FIG. 2 is a cross-sectional view taken along lines 2—2 of FIG. 1A to illustrate the panel construction in accordance with this invention for operation in a reflective mode.

The construction of the foregoing liquid crystal displays can be illustrated by reference to FIG. 2 which is, for purposes of this description, taken along line 2 — 2 of FIG. 1A. As shown, the unit assembly is fabricated from two planar dielectric or insulating support units 10 and 11 disposed in parallel relationship to each other to define an enclosed area in which is disposed a film or layer 12 of liquid crystal material, which in a preferred embodiment was a nematic material which illustratively may be comprised of N-(p-methoxy benzylidene)-p-n-butylaniline (e.g. MBBA) and N-p-ethoxy benzylidene-p-n-butylaniline (e.g. EBBA) and suitable dopants such as hexadecyl trimethyl ammonium bromide (e.g. HDAB), hexadecyl pyridenium bromide (e.g. HDPB) and methoxy benzylidene amino phenol (e.g. MBAP). In accordance with usual practice, only one of the planar supports need be transparent, while the other of the supports may be transparent or reflective, depending on the desired mode of operation, which for purposes of this application will be illustratively described with reference to a reflective mode of operation utilizing a color adapted reflective back plate in accordance with this invention, as more particularly described below.

Each of support plates 10 and 11 will have deposited on their adjacent surfaces an electrode pattern corresponding to the desired pattern of informational display segments. For example, for a numerical display such as in FIG. 1A, the electrode pattern on the backplate 10 can be deposited as a plurality of spaced film segments of a conductive material to define a plurality of image segments 2 each of which has an associated conductor 13 for connection to addressing circuits, as schematically indicated by the control circuit 5 in the drawings. For the reflective mode of operation, the electrode pattern can comprise reflective films of a conductive composition such as chromium, aluminum and the like, which can be deposited in thicknesses of about 5,000 Angstroms by conventional techniques such as evaporation, RF sputtering, and the like.

Figure 3A:
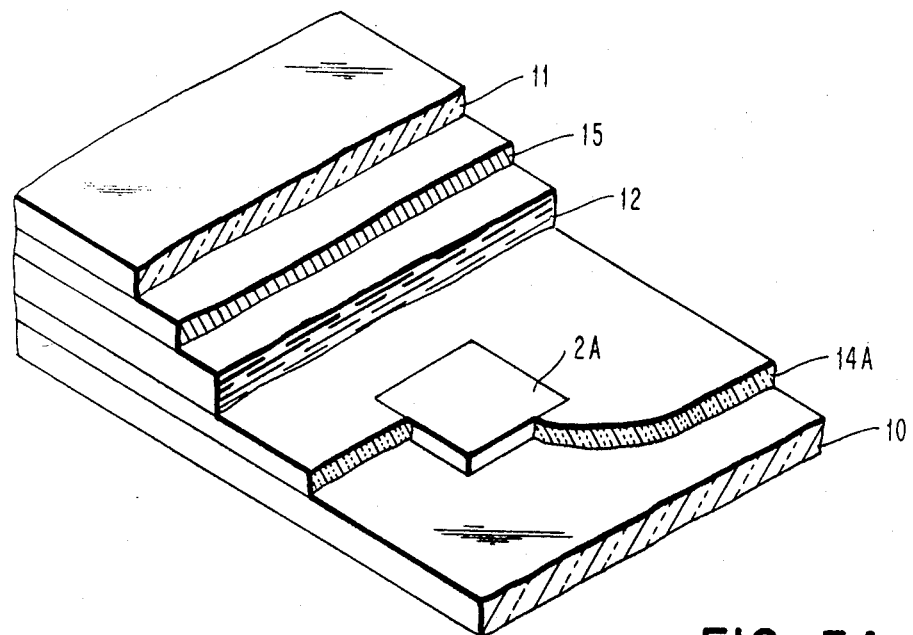
FIG. 3A is a perspective view, partly in section, illustrating construction details of a liquid crystal cell in accordance with one embodiment of this invention.
Figure 3B:
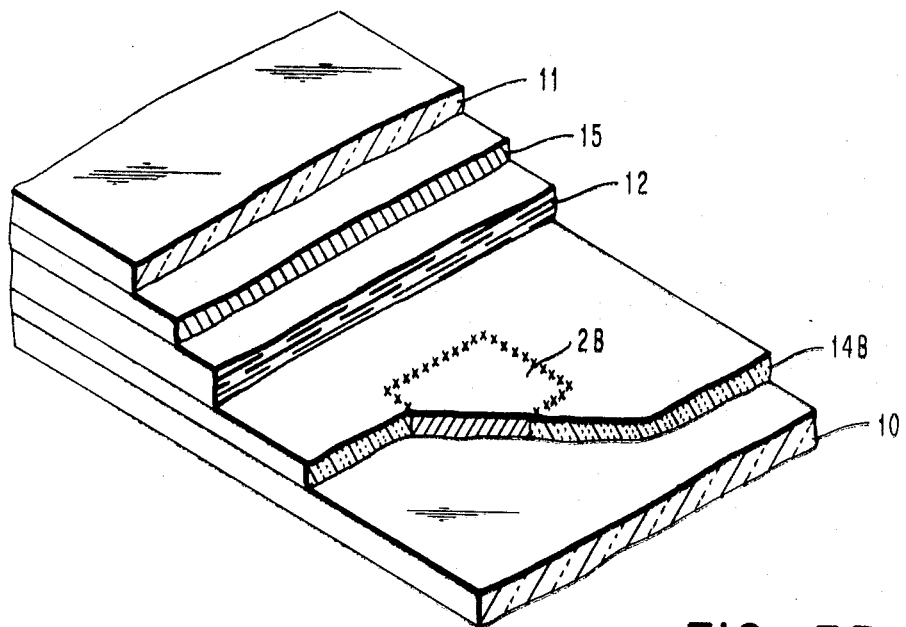
FIG. 3B is a perspective view, partly in section, illustrating construction details of a liquid crystal panel in accordance with another embodiment of this invention.

Similarly, for X-Y informational displays such as shown in FIG. 1B, the electrode can be deposited in a corresponding X-Y array of electrode segments of which one unit 2A or 2B is shown in respective FIGS. 3A and 3B.

Alternatively, the image electrodes of such displays can comprise diffused regions 2C of an integrated device which may be formed, as described in U.S. Pat. No. 3,631,411, is a semiconductor substrate 10A which can also serve as a back support of the assembly, as in the form shown in FIG. 4.

In accordance with this invention, the imaging electrode segments 2 are circumscribed by a reflective light shield 14 having a hue, chroma and brightness required for the mode of operation, e.g. negative or positive mode. As indicated above, for a positive operating mode of the liquid crystal display color matching will be between the shield 14 and the image electrode segments 2; and conversely for a negative operating mode color matching will be between the shield 14 and the liquid crystal composition in the light scattering state.

One convenient manner of forming the color shield is by anodizing a layer of aluminum suitably deposited (e.g. by evaporation, sputtering, etc.) on the back support 10 so as to convert the aluminum to a dielectric or insulating layer 14A of aluminum oxide which circumscribes the image segment electrodes 2A as in FIG. 3A and which is subsequently dyed. A particularly effective manner is by selectively anodizing portions 14B of an aluminum layer in a pattern which will circumscribe unanodized portions 2B of the metal layer as shown in FIG. 3B to serve as the image electrode segments of the liquid crystal assembly. This can be readily accomplished by masking the portions of an aluminum layer with positive photoresist such as Azoplate's commercial AZ-1350 or negative photoresist such as Eastman Kodak's commercial KTFR and the like, and anodizing the remaining portions of the aluminum layer which are suitably dyed subsequently.

For example, to adapt a liquid crystal assembly for a negative mode of operation, the portions 14B of an aluminum film (e.g. of about 5,000 Angstroms thick), about masked areas 2b can be anodized in the following manner. A barrier layer is formed on the exposed metallized electrodes in an electrolyte solution of 30 percent ammonium borate in ethylene glycol and a current density of approximately 1 ma/cm$^2$. The mask is removed and the aluminum is anodized to completion in an electrolyte solution of 20 percent H$_2$SO$_4$ at 13 ma/cm$^2$ or oxalic acid at 3 ma/cm$^2$. The electrodes are protected from anodization by the barrier layer. The color of the anodized aluminum is dependent on the current density used. After anodizing there are residual metallic isolated particles which are not anodized. The size of these particles is dependent on the current density and affects the reflectivity characteristics of the layer and hence affects the color. The residue increases as the current density increases. The current density is adjusted to control the actual color of the film depending on whether negative or positive mode is desired.

The dye anodizing of the aluminum film (if desired) needs only affect the surface thereof in view of its electrical isolation from the device proper (e.g. semiconductor support 10A) by means of the oxide layer 19 and from the liquid crystal layer 12 by means of a silicon oxide overlay 32 deposited in accordance with any well-known technique.

Dye anodizing of the aluminum film, into the color shield 31 can be done by any of several conventional techniques. In accordance with one such method, the aluminum film is anodized by one of the desired techniques one such technique having been described above. Depending on the application, the color of the anodized aluminum may be black or any one of a number of gray scales. The appropriate organic dye (such as organic aniline dyestuffs as for example commercially available Aluminum Grey NL Paste (Sandoz Corp.) or Aluminum Deep Black MLW) is selected and the anodized aluminum is immersed in the dye solution at 60°–70° C which is absorbed by the porous anodic oxide. The pH of the solution should be controlled between 4.0–5.0 to accelerate absorbance.

As shown in the drawings, the liquid crystal display assembly also includes a cover unit comprised of a transparent support plate 11 (e.g. glass) having deposited on its inner face a transparent electrode 15 of a conductive composition such as $In_2O_3$. On assembly of the units of the cell, the liquid crystal layer 12 can be confined between the support plates 10 and 11 by a conventional seal around their peripheries, as for example a gasket, glass frit or epoxy resins.

Figure 4:
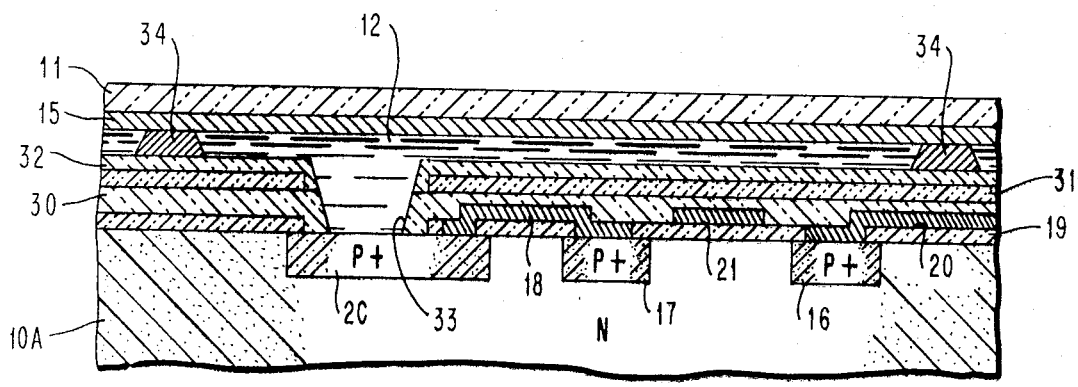
FIG. 4 is a cross-sectional view illustrating constructional details of a single liquid crystal cell in accordance with another embodiment of this invention.

FIG. 4 illustrates the adaptation of this invention to liquid crystal displays utilizing an integrated circuit for selective control of the transparent and scattering states of a nematic liquid crystal material such as the composition described above and comprised of 55 mole percent MBBA and 45 mole percent EBBA with 0.1 percent MBAP and 0.01 percent HDPB. This assembly utilizes for a support plate 10A a semiconductor substrate of one conductivity type (e.g. N-type silicon) in which are formed diffused regions 16, 17 and 2C of an opposite type conductivity (e.g. P+ type). In this structure, P+ regions 16 and 17 serve, respectively, as source and drain regions of an FET transistor, and P+ region 2C, which is electrically connected to drain region 17, by a conductor 18, serves as an electrode for the liquid crystal cell. Such diffused regions are formed by diffusion of P+ type impurities through corresponding openings in a silicon oxide layer 19, over which is formed (by deposition and photolithographic delineation) a conductor pattern of aluminum to form the source electrode 20, the gate electrode 21 and the connector 18.

In the next operation a second silicon oxide layer 30 of about 2 microns is deposited (e.g. pyrolytic or sputtered) over the metallization, and a second layer of an aluminum thickness of 0.5–1.0 micrometers deposited over the structure which (after formation of an access opening 33 therethrough over the diffused electrode region 2C) is dye anodized to form a color shield 31. In this embodiment for a negative mode of operation, the color shield 31 is given a color, hue and brightness substantially matching the induced color formed as the result of the scattering state in the nematic liquid crystal layer 12. Conversely, this color shield 31 will form a lighter background compared to the silicon color of the diffused electrode regions 2C which will be visible when the liquid crystal layer 12 is in its unenergized transparent state. Informational images are formed by screening out electrodes (which are complementary to the information pattern) by applications of a signal thereto to switch corresponding portions of the liquid crystal material adjacent to them into the scattering state to merge their resulting induced color into the background of the color shield 31. The signals are applied to the electrode in a pattern to retain the transparent state of the liquid crystal in the configuration of the intelligence to be displayed by means of the continued optical access to darker areas of the silicon electrode regions through the transparent areas of the liquid crystal layer 12. To paraphase, the signals are applied to the electrodes 2C in a pattern complementary to the desired information display whereby conversely, the corresponding portions of the liquid crystal layer 12 (adjacent the accessed electrodes 2C) are switched in a pattern complementary to the information to be displayed.

After deposition of the oxide layer 32 over the aluminum anodized layer 31, a number of aluminum bosses or ridges 34 are deposited on oxide layer 32 to form standoffs and means for sealing the display unit by bonding to the transparent electrode (e.g. tin or indium oxide) coated on the transparent support plate 11 (e.g. glass) to confine the liquid crystal layer in the cell assembly. As will be understood other conventional sealing techniques can be also employed.

As indicted above, the liquid crystal cell can be adapted to a positive mode of operation by dye-anodizing the aluminum film precursor (for the color shield 31) to match the color of the silicon electrode region 2C. In this manner the shield 31 and the electrode regon 2C will form a common color background through the liquid crystal layer 12 in its transparent state with regions thereof switched into the readable scattering state by application of signal to the adjacent electrodes in accordance with the desired informational pattern. Anodizing of the color shield 31 for the positive mode of operation will follow the same processing as that for the negative mode with the exception of controlling the current density to get the proper match. A metal layer with slightly different reflectivity than silicon can be evaporated as the electrode to change the contrast conditions (e.g. Mo,Cr,Ta,Pd and the like). The anodized layer can also be dyed as described above.

While the invention has been particularly shown and described with reference to a preferred embodiment thereof and applications therefore, it will be understood by those skilled in the art that various changes in form and details may be made therein and the invention employed for various applications without departing from the spirit and scope of the invention.

What is claimed is:

1. A liquid crystal cell comprising a layer of liquid crystal material;
   a transparent electrode on one of a pair of opposite faces of said layer,
   a dielectric light shield on the other face of said pair of opposite faces of said material,
   said light shield having at least one electrode window opening adjacent a portion of said other face of said layer,
   a discrete second electrode adjacent each of a respective said one of said openings opposite said portion of said other face of said layer, with said light shield having a hue, chroma and brightness substantially matching the color of either of said material in its light scattering state or said second electrode when said material is in its light transmitting state.

2. The liquid crystal cell of claim 1 wherein said second electrode comprises a surface portion of a semiconductor substrate and said window comprises an opening in said shield.

3. The liquid crystal cell of claim 2 wherein said surface portion comprises a diffused region in said semiconductor substrate.

4. The liquid crystal cell of claim 3, wherein said diffused region comprises a drain element portion of an FET.

5. The liquid crystal cell of claim 4 including an FET structure in said semiconductor substrate spaced from said diffused region with the drain region of said FET having the same conductivity type as said diffused region, and means electrically connecting said drain and diffused regions.

6. The liquid crystal cell of claim 1 wherein said light shield comprises a dyed anodized first portion of an aluminum film.

7. The liquid crystal cell of claim 6 wherein said light shield window and said second electrode comprise a second portion of said aluminum film.

8. The liquid crystal cell of claim 6 wherein said second electrode comprises a surface portion of a semiconductor substrate and said window comprises an opening in said shield.

9. The liquid crystal cell of claim 8 wherein said surface portion comprises a diffused region in said semiconductor substrate.

10. The liquid crystal cell of claim 9 wherein said diffused region comprises a drain element portion of an FET.

11. The liquid crystal cell of claim 10 including an FET structure in said semiconductor substrate spaced from said diffused region with the drain region of said FET having the same conductivity type as said diffused region, and means electrically connecting said drain and diffused regions.

12. The liquid crystal cell of claim 1 wherein said liquid crystal material is nematic with said light shiled substantially matching the color thereof in its light scattering state and in color contrast with said second electrode for operation of said cell in the negative mode.

13. The liquid crystal cell of claim 12 wherein said second electrode comprises a surface portion of a semiconductor substrate and said window comprises an opening in said shield.

14. The liquid crystal cell of claim 13 wherein said surface portion comprises a diffused region in said semiconductor substrate.

15. The liquid crystal cell of claim 14 wherein said diffused region comprises a drain element extension of an FET.

16. The liquid crystal cell of claim 15 including an FET structure in said semiconductor substrate spaced from said diffused region with the drain region of said FET having the same conductivity type as said diffused region, and means electrically connecting said drain and diffused regions.

17. The liquid crystal cell of claim 12 wherein said light shield comprises a dyed anodized first portion of an aluminum film.

18. The liquid crystal cell of claim 17 wherein said light shield window and said second electrode comprise a second portion of said aluminum film.

19. The liquid crystal cell of claim 17 wherein said second electrode comprises a surface portion of a semiconductor substrate and said wondow comprises an opening in said shield.

20. The liquid crystal cell of claim 19 wherein said surface portion comprises a diffused region in said semiconductor substrate.

21. The liquid crystal cell of claim 20 wherein said diffused region comprises a drain element portion of an FET.

22. The liquid crystal cell of claim 21 including an FET structure in said semiconductor substrate spaced from said diffused region with the drain region of said FET having the same conductivity type as said diffused region, and means electrically connecting said drain and diffused regions.

23. The liquid crystal cell of claim 1 wherein said liquid crystal material is nematic with said light shield substantially matching the color of said second electrode and in color contrast with said liquid material in its light transmitting state for operation of said cell in a positive mode.

24. The liquid crystal cell of claim 23 wherein said second electrode comprises a surface portion of a semiconductor substrate and said window comprises an opening in said shield.

25. The liquid crystal cell of claim 24 wherein said surface portion comprises a diffused region in said semiconductor substrate.

26. The liquid crystal cell of claim 25 wherein said diffused region comprises a drain element portion of an FET.

27. The liquid crystal cell of claim 26 including an FET structure in said semiconductor substrate spaced from said diffused region with the drain region of said FET having the same conductivity type as said diffused region, and means electrically connecting said drain and diffused regions.

28. The liquid crystal cell of claim 23 wherein said light shield comprises a dyed anodized first portion of an aluminum film.

29. The liquid crystal cell of claim 28 wherein said second electrode comprises a surface portion of a semiconductor substrate and said window comprises an opening in said shield.

30. The liquid crystal cell of claim 29 wherein said surface portion comprises a diffused region in said semiconductor substrate.

31. The liquid crystal cell of claim 30 wherein said diffused region comprises a drain element extension of an FET.

32. The liquid crystal cell of claim 31 including an FET structure in said semiconductor substrate spaced from said diffused region with the drain region of said FET having the same conductivity type as said diffused region, and means electrically connecting said drain and diffused regions.

33. The liquid crystal cell of claim 23 wherein said light shield window and said second electrode comprise a second portion of said aluminum film.

34. The liquid crystal cell of claim 1 wherein said light shield and said second electrode are reflective for operation of said cell in the reflective mode.

35. The liquid crystal cell of claim 34 wherein said second electrode comprises a surface portion of a semiconductor substrate and said window comprises an opening in said shield.

36. The liquid crystal cell of claim 35 wherein said surface portion comprises a diffused region in said semiconductor substrate.

37. The liquid crystal cell of claim 36 wherein said diffused region comprises a drain element extension of an FET.

38. The liquid crystal cell of claim 37 including an FET structure in said semiconductor substrate spaced from said diffused region with the drain region of said FET having the same conductivity type as said diffused region, and means electrically connecting said drain and diffused regions.

39. The liquid crystal cell of claim 34 wherein said light shield comprises a dyed anodized first portion of an aluminum film.

40. The liquid crystal cell of claim 39 wherein said second electrode comprises a surface portion of a semiconductor substrate and said window comprises an opening in said shield.

41. The liquid crystal cell of claim 40 wherein said surface portion comprises a diffused region in said semiconductor substrate.

42. The liquid crystal cell of claim 41 wherein said diffused region comprises a drain element extension of an FET.

43. The liquid crystal cell of claim 42 including an FET structure in said semiconductor substrate spaced from said diffused region with the drain region of said FET having the same conductivity type as said diffused region, and means electrically connecting said drain and diffused regions.

44. The liquid crystal cell of claim 34 wherein said light shield window and said second electrode comprise a second portion of said aluminum film.

45. The liquid crystal cell of claim 1 wherein said light shield window corresponds to informational segments of a display panel.

* * * * *